(12) United States Patent
Kim et al.

(10) Patent No.: US 10,135,373 B2
(45) Date of Patent: Nov. 20, 2018

(54) APPARATUS AND METHOD FOR CONTROLLING PERMANENT MAGNET MOTOR

(71) Applicant: Korea Institute of Industrial Technology, Chungcheongnam-do (KR)

(72) Inventors: Myung Bok Kim, Sejong (KR); Sung Ho Lee, Gwangju (KR); Bong Woo Kwak, Chungcheongnam-do (KR)

(73) Assignee: Korea Institute of Industrial Technology, Chungcheongnam-do (KR)

( * ) Notice: Subject to any disclaimer, the term of this patent is extended or adjusted under 35 U.S.C. 154(b) by 0 days.

(21) Appl. No.: 15/320,354

(22) PCT Filed: Dec. 29, 2014

(86) PCT No.: PCT/KR2014/012957
§ 371 (c)(1),
(2) Date: Dec. 20, 2016

(87) PCT Pub. No.: WO2015/199302
PCT Pub. Date: Dec. 30, 2015

(65) Prior Publication Data
US 2017/0155349 A1    Jun. 1, 2017

(30) Foreign Application Priority Data

Jun. 27, 2014  (KR) ........................ 10-2014-0079907

(51) Int. Cl.
*H02P 21/14* (2016.01)
*H02P 6/28* (2016.01)
(Continued)

(52) U.S. Cl.
CPC .............. *H02P 21/141* (2013.01); *H02P 6/20* (2013.01); *H02P 6/28* (2016.02); *H02P 21/24* (2016.02); *H02P 21/34* (2016.02)

(58) Field of Classification Search
CPC .......... H02P 21/141; H02P 6/28; H02P 21/06; H02P 23/14; H02P 27/12; G01R 33/00
See application file for complete search history.

(56) References Cited

U.S. PATENT DOCUMENTS

2009/0261774 A1* 10/2009 Yuuki ................. H02K 1/2766
                                                              318/720
2010/0259204 A1* 10/2010 Imura ................ B60L 11/1803
                                                              318/400.02

(Continued)

FOREIGN PATENT DOCUMENTS

JP      2001161009 A     6/2001
JP      2001309679 A    11/2001

(Continued)

*Primary Examiner* — Bickey Dhakal
*Assistant Examiner* — Said Bouziane
(74) *Attorney, Agent, or Firm* — Norton Rose Fulbright US LLP

(57) ABSTRACT

An apparatus and a method for controlling a permanent magnet motor are provided. An apparatus for controlling a permanent magnet motor, according to an embodiment of the present invention, comprises: a current control unit for generating a control current so as to drive a motor according to an initial set current or a current corresponding to an estimated magnetic flux; a motor driving unit for driving the motor according to the control current of the current control unit; a measurement unit for measuring a driving voltage and current of the motor; and a magnetic flux estimation unit preliminarily driving the motor with the initial set current or the current corresponding to the estimated magnetic flux, so as to estimate the magnetic flux of the motor on the basis of the current measured when the motor is preliminarily driven and a voltage model of the motor according to the measured voltage, and adaptively controlling the magnetization current or demagnetization current of the motor such that the estimated magnetic flux is within an error range.

8 Claims, 6 Drawing Sheets

(51) Int. Cl.
   *H02P 6/20* (2016.01)
   *H02P 21/34* (2016.01)
   *H02P 21/24* (2016.01)
   *H02P 21/22* (2016.01)
   *H02P 27/08* (2006.01)

(56) References Cited

U.S. PATENT DOCUMENTS

2011/0169436 A1\* 7/2011 Takahashi ............... H02P 23/14
  318/400.3
2014/0167659 A1\* 6/2014 Handa ................. H02P 21/0035
  318/400.02
2016/0149524 A1\* 5/2016 Fukushige .......... H02P 21/0089
  318/400.41

FOREIGN PATENT DOCUMENTS

| | | | |
|---|---|---|---|
| JP | 2005304204 A | 10/2005 |
| JP | 2009095084 A | 4/2009 |
| KR | 20090055321 A | 6/2009 |

\* cited by examiner

APPARATUS AND METHOD FOR CONTROLLING PERMANENT MAGNET MOTOR

CROSS-REFERENCE TO RELATED APPLICATIONS

This application is a national phase application under 35 U.S.C. § 371 of International Application No. PCT/KR2014/012957 filed Dec. 29, 2014, which claims priority to Republic of Korean Patent Application No. 10-2014-0079907 filed Jun. 27, 2014. The entire contents of each of the above-referenced applications are incorporated into the present application by reference.

TECHNICAL FIELD

The present invention relates to an apparatus and method for controlling a permanent magnet motor, and more particularly, to an apparatus and method for controlling a variable magnetic flux motor.

BACKGROUND ART

Generally, a permanent magnet motor is operated in a speed control mode or torque control mode and a method of controlling both speed and torque may be used depending on applications, and in the latter case, a variable magnetic flux permanent magnet motor in which magnetic flux of the permanent magnet is variable depending on operation modes is used.

In such a variable magnetic flux permanent magnet motor, magnetic flux of the motor is varied by magnetization or demagnetization. For example, in the case of a washing machine, which is a typical application of the variable magnetic flux permanent magnet motor, magnetic flux of the motor is varied by changing a magnetizing amount or demagnetizing amount of the permanent magnet because high-speed rotation and low torque are required for spin-drying laundry and low-speed rotation and high torque are required for washing laundry.

Meanwhile, a conventional permanent magnet motor mostly uses magnetization current control or demagnetization current control because controlling the magnetic flux itself to vary the magnetic flux for selectively controlling the speed or torque is very difficult.

However, since magnetic flux of a motor cannot be accurately controlled only by the control of magnetization current or demagnetization current, and particularly, the magnetization current and demagnetization current used for the control are initially set or have a fixed value, there is a problem in that control of a motor cannot adapt to environmental changes such as aging of the motor or the like.

DISCLOSURE

Technical Problem

The present invention is directed to providing an apparatus and method for controlling a permanent magnet motor capable of accurately controlling magnetic flux within a tolerance range on the basis of magnetic flux obtained from mathematical modeling which uses set magnetic flux and actually measured current in an operation of magnetization or demagnetization of the motor.

Technical Solution

One aspect of the present invention provides an apparatus for controlling a permanent magnet motor including: a current control unit which generates a control current to drive the motor according to a current corresponding to an initial set current or estimated magnetic flux; a motor driving unit which drives the motor according to the control current of the current control unit; a measurement unit which measures a driving voltage and a driving current of the motor; and a magnetic flux estimation unit which preliminarily drives the motor using the current corresponding to the initial set current or the estimated magnetic flux, estimates magnetic flux of the motor on the basis of the current measured in the preliminary driving and a voltage model of the motor according to the voltage measured in the preliminary driving, and adaptively controls a magnetization current or demagnetization current of the motor so that the estimated magnetic flux falls within a tolerance range.

The magnetic flux estimation unit may include a motor model current calculator which calculates a q-axis current according to the voltage model of the motor based on the preliminary driving, and a magnetic flux calculator which adaptively calculates the magnetic flux on the basis of the calculated q-axis current and the measured current so that a difference between the currents is minimized.

The motor model current calculator may calculate the q-axis current according to the following equation, $$I_q^M(k+1) = I_q(k) + \frac{T_{SW}}{L_q}\{V_q^*(k) - R_s I_q(k) - \omega_e \cdot L_d I_d(k) - \omega_e \cdot \hat{\lambda}_m(k)\}.$$

Here, $I_q$ is a measured q-axis current, $T_{SW}$ is a switching interval, $L_q$ is q-axis inductance, $V_q^*$ is a q-axis voltage, $R_s$ is phase resistance, $\omega_e$ is an electrical angular velocity, $\hat{\lambda}_m$ is estimated magnetic flux, $L_d$ is d-axis inductance, and $I_d$ is a d-axis current.

The magnetic flux calculator may calculate the estimated magnetic flux according to the following equation, $$\hat{\lambda}_m(k+1) = \hat{\lambda}_m(k) - k_e \cdot (I_q(k) - I_q^M(k)), \quad 0 < k_e < \frac{L_q f_{SW}}{\omega_e}$$

Here, $I_q$ is a measured q-axis current, $I_q^M$ is the calculated q-axis current, $k_e$ is an estimated gain of magnetic flux, and $f_{SW}$ is a switching frequency ($1/T_{SW}$).

The magnetic flux estimation unit may control the current control unit to generate three times the magnetization current or demagnetization current or more when the calculated magnetic flux is out of the tolerance range and may control the current control unit to drive the motor with a current corresponding to the magnetic flux when the calculated magnetic flux is within the tolerance range.

The preliminary driving may be driving by a current with a sine wave form of ten cycles or more.

Another aspect of the present invention provides a method for controlling a permanent magnet motor including: an operation of setting an initial current and applying the set initial current to the motor; an operation of estimating magnetic flux in which a current and a voltage of the motor are measured, magnetic flux of the motor is estimated on the basis of the measured current and a voltage model of the motor according to the measured voltage, and a magnetization current or demagnetization current of the motor is adaptively controlled so that the estimated magnetic flux falls within a tolerance range; and an operation of driving the motor according to a current corresponding to the estimated magnetic flux.

The operation of estimating magnetic flux may include: an operation of preliminarily driving the motor at a rated rotation speed according to the set magnetization current or demagnetization current; an operation of adaptively calculating the magnetic flux, in which a q-axis current is calculated according to the voltage model of the motor based on the preliminary driving, on the basis of the calculated q-axis current and the measured current so that a difference between the currents is minimized; an operation of determining whether the calculated magnetic flux falls within the tolerance range; and an operation of applying the magnetization current or demagnetization current to adjust the magnetic flux according to a result of the operation of determining.

The operation of calculating the magnetic flux may calculate the q-axis current according to the following equation, $$I_q^M(k+1) = I_q(k) + \frac{T_{SW}}{L_q}\{V_q^*(k) - R_s I_q(k) - \omega_e \cdot L_d I_d(k) - \omega_e \cdot \hat{\lambda}_m(k)\}.$$

Here, $I_q$ is a measured q-axis current, $T_{SW}$ is a switching interval, $L_q$ is q-axis inductance, $V_q^*$ is a q-axis voltage, $R_s$ is phase resistance, $\omega_e$ is an electrical angular velocity, $\hat{\lambda}_m$ is an estimated magnetic flux, $L_d$ is d-axis inductance, and $I_d$ is a d-axis current.

The operation of calculating the magnetic flux may include calculating the estimated magnetic flux according to the following equation, $$\hat{\lambda}_m(k+1) = \hat{\lambda}_m(k) - k_e \cdot (I_q(k) - I_q^M(k)), \quad 0 < k_e < \frac{L_q f_{SW}}{\omega_e}$$

Here, $I_q$ is a measured q-axis current, $I_q^M$ is the calculated q-axis current, $k_e$ is an estimated gain of magnetic flux, and $f_{SW}$ is a switching frequency ($1/T_{SW}$).

The operation of preliminary driving may include driving by a current with a sine wave form of ten cycles or more.

Advantageous Effects

An apparatus and method for controlling a permanent magnet motor according to one embodiment of the present invention can effectively control magnetic flux by a motor model based on an actually measured current of the motor, and accordingly can enhance efficiency of the permanent magnet motor.

An apparatus and method for controlling a permanent magnet motor according to one embodiment of the present invention can calculate an optimal magnetic flux even when an environment is changed such as with aging of the motor or the like because estimated magnetic flux is controlled, and accordingly efficiency of the motor can be maintained at an optimal state regardless of the environment.

MODES OF THE INVENTION

Figure 1:
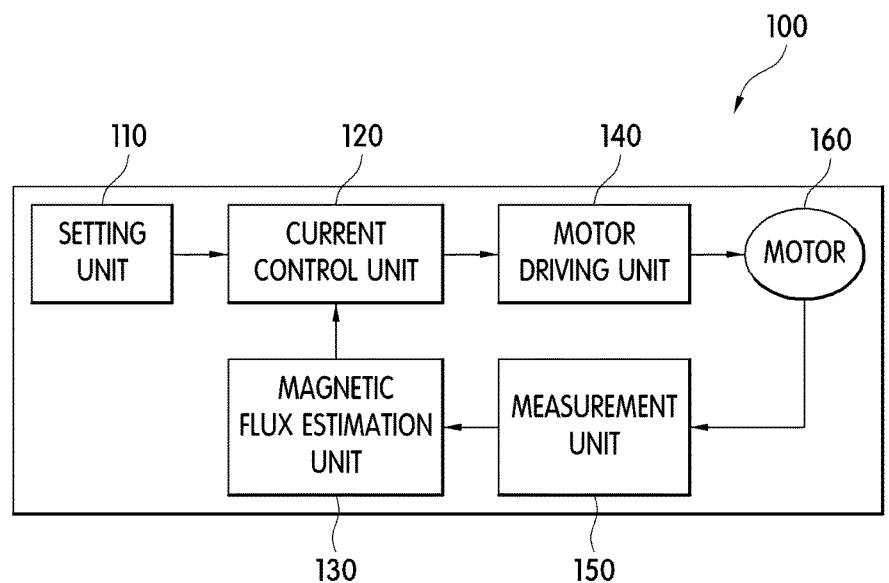
FIG. 1 is a block diagram of an apparatus for controlling a permanent magnet motor according to one embodiment of the present invention.

Hereinafter, embodiments of the present invention will be described in detail with reference to the accompanying drawings so that those skilled in the art of the technical field to which the present invention belongs may easily implement the technical sprit of the present invention. The present invention may, however, be embodied in various different forms and is not to be construed as limited to the embodiments set forth herein. Further, in the drawings, for the sake of clarity of the present invention, portions unrelated to the explanation may be omitted from the illustration, and like numbers refer to like elements throughout the specification.

FIG. 1 is a block diagram of an apparatus for controlling a permanent magnet motor according to one embodiment of the present invention. Hereinafter, an apparatus for controlling a permanent magnet motor according to one embodiment of the present invention will be described in detail with reference to the accompanying drawings.

Referring to FIG. 1, an apparatus for controlling a permanent magnet motor 100 according to one embodiment of the present invention includes a setting unit 110, a current control unit 120, a magnetic flux estimation unit 130, a motor drive unit 140, a measurement unit 150, and a motor 160.

The setting unit 110 stores a set value or an initial value of a magnetization current or demagnetization current for varying magnetic flux of the motor 160, and an operation mode of the motor 160 is selected by a user. For example, at the setting unit 110, a demagnetization current $I_1$ may be set to zero and a magnetization current $I_2$ may be set to a first set value $I_{20}$ for a low-speed high-torque operation of the motor 160 for which magnetization is required, and a demagnetization current $I_3$ may be set to a second set value $I_{30}$ and a demagnetization current $I_4$ may be set to zero for a high-speed low-torque operation of the motor 160 for which demagnetization is required.

The current control unit 120 generates a control current for driving the motor 160 according to a current corresponding to an initial set current or an estimated magnetic flux. For example, the current control unit 120 may generate a magnetization current having the first set value which is initially set or a demagnetization current having the second set value which is initially set according to an operation selected during an initial operation. In addition, the current control unit 120 may generate the demagnetization current or magnetization current corresponding to estimated magnetic flux when the motor is preliminarily driven according to the estimated magnetic flux, as will be described below.

The magnetic flux estimation unit 130 may preliminarily drive the motor 160 using the initial set current or using the demagnetization current or magnetization current corresponding to the estimated magnetic flux. Here, the preliminary driving may be driving by a current with a sine wave form of ten cycles or more for sufficient magnetization and demagnetization.

In addition, the magnetic flux estimation unit 130 may estimate the magnetic flux of the motor 160 on the basis of a current measured from the motor 160 during the preliminary driving and a voltage model of the motor 160 according to a voltage measured from the motor 160 during the preliminary driving, and may adaptively control the magnetization current or demagnetization current of the motor 160 so that the estimated magnetic flux falls within a tolerance range.

Hereinafter, the magnetic flux estimation unit 130 will be described in detail with reference to another drawing.

Figure 2:
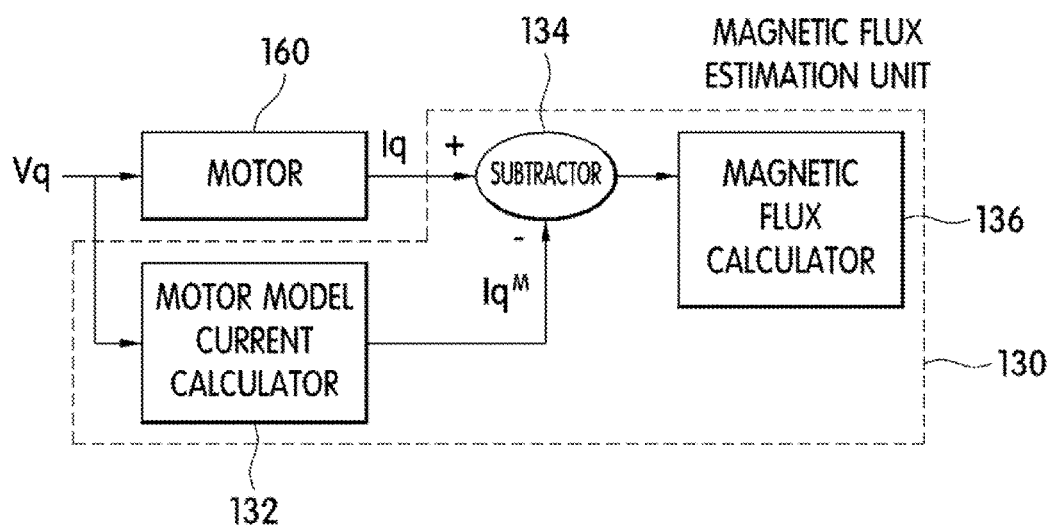
FIG. 2 is a block diagram illustrating a detailed configuration of the magnetic flux estimation unit of FIG. 1.

FIG. 2 is a block diagram illustrating a detailed configuration of the magnetic flux estimation unit of FIG. 1.

Referring to FIG. 2, the magnetic flux estimation unit 130 includes a motor model current calculator 132, a subtractor 134, and a magnetic flux calculator 136.

The motor model current calculator 132 may calculate a q-axis current according to the voltage model of the motor 160 based on the preliminary driving. Here, a mathematical model for the q-axis voltage of the motor 160 may be defined as follows, $$V_q = L_q \cdot \frac{di_q}{dt} + R_s \cdot i_q + \omega_e \cdot L_d \cdot i_d + \omega_e \cdot \lambda_m$$

Here, $V_q$ may be the q-axis voltage, $L_q$ may be q-axis inductance, $i_q$ may be a q-axis current, $R_s$ may be phase resistance, $i_d$ may be a d-axis current, $\omega_e$ may be an electrical angular velocity, $\lambda_m$ may be an estimated magnetic flux, and $L_d$ may be d-axis inductance.

Using the above equation, a q-axis voltage equation of the motor 160 may be transformed into a discrete equation as follows on the basis of a parameter estimation algorithm, $$V_q^*(k) = L_q \cdot \frac{I_q^M(k+1) - I_q^M(k)}{T_{SW}} + R_s \cdot I_q^M(k) + \omega_e \cdot L_d \cdot I_d^M(k) + \omega_e \cdot \hat{\lambda}_m(k)$$

Here, $$\frac{I_q^M(k+1) - I_q^M(k)}{T_{SW}}$$

is a q-axis current variation which is modeled over time and is measured by a switching interval $T_{SW}$ and $\hat{\lambda}_m$ is an estimated magnetic flux.

Using the above discrete equation, an incremental discrete equation of the q-axis current of the motor 160 is as follows, $$I_q^M(k+1) = I_q(k) + \frac{T_{SW}}{L_q}\{V_q^*(k) - R_s I_q(k) - \omega_e \cdot L_d I_d(k) - \omega_e \cdot \hat{\lambda}_m(k)\}.$$

That is, the magnetic flux calculator 136 may calculate the q-axis current of the motor 160 according to the incremental discrete equation of the q-axis current.

The subtractor 134 subtracts the q-axis current measured when the motor 160 is preliminarily driven and the q-axis current calculated according to the discrete equation of the q-axis current. That is, the subtractor 134 calculates a difference between the measured q-axis current and the calculated q-axis current.

On the basis of the q-axis current calculated from the discrete equation of the current and the current measured during the preliminary driving, the magnetic flux calculator 136 may calculate the difference between the currents, that is, adaptively calculate the magnetic flux so that a result of the subtractor 134 is minimized. In one embodiment, the magnetic flux calculator 136 calculates the estimated magnetic flux according to the following equation, $$\hat{\lambda}_m(k+1) = \hat{\lambda}_m(k) - k_e \cdot (I_q(k) - I_q^M(k)), \quad 0 < k_e < \frac{L_q f_{SW}}{\omega_e}$$

Here, $I_q$ may be a measured q-axis current, $I_q^M$ may be the calculated q-axis current, $k_e$ may be an estimated gain of magnetic flux, and $f_{SW}$ may be a switching frequency ($1/T_{SW}$).

As illustrated in FIG. 2, the magnetic flux calculator 136 calculates magnetic flux corresponding to the difference between the current actually measured from the motor 160 and the current calculated by the motor model, determines whether the calculated magnetic flux falls within the tolerance range, and, when the calculated magnetic flux is out of the tolerance range, may control the current control unit 120 to generate three times the corresponding magnetization current or demagnetization current or more so that an additional magnetization current or demagnetization current is applied to the motor 160 according to an adaptive algorithm to increase or decrease the magnetic flux to be within the tolerance range. In addition, when the calculated magnetic flux is determined to be within the tolerance range, the magnetic flux calculator 136 may control the current control unit 120 to drive the motor by a current corresponding to the calculated magnetic flux.

Referring to FIG. 1 again, the motor drive unit 140 may drive the motor 160 according to the control current of the current control unit 120. For example, the motor drive unit 140 may generate a three-phase alternating current (AC) voltage according to the current of the current control unit 120 that is applied to the motor 160.

The measurement unit 150 measures drive currents flowing in each phase of the motor 160 and drive voltages corresponding thereto. For example, the measurement unit 150 may measure the phase currents between the motor drive unit 140 and the motor 160, and the drive voltages corresponding thereto.

The motor 160 is a permanent magnet motor and includes a stator and a rotor installed outside the stator, in which the stator includes a stator core and a stator winding and the rotor may be configured with a rotor core and a plurality of permanent magnets which are integrally formed of a molding resin. Such a motor 160 may be driven when a three-phase AC voltage from the motor drive unit 140 is applied to the stator winding.

The magnetic flux estimation unit 130 configured as above will be described in detail with reference to another drawing.

Figure 3:
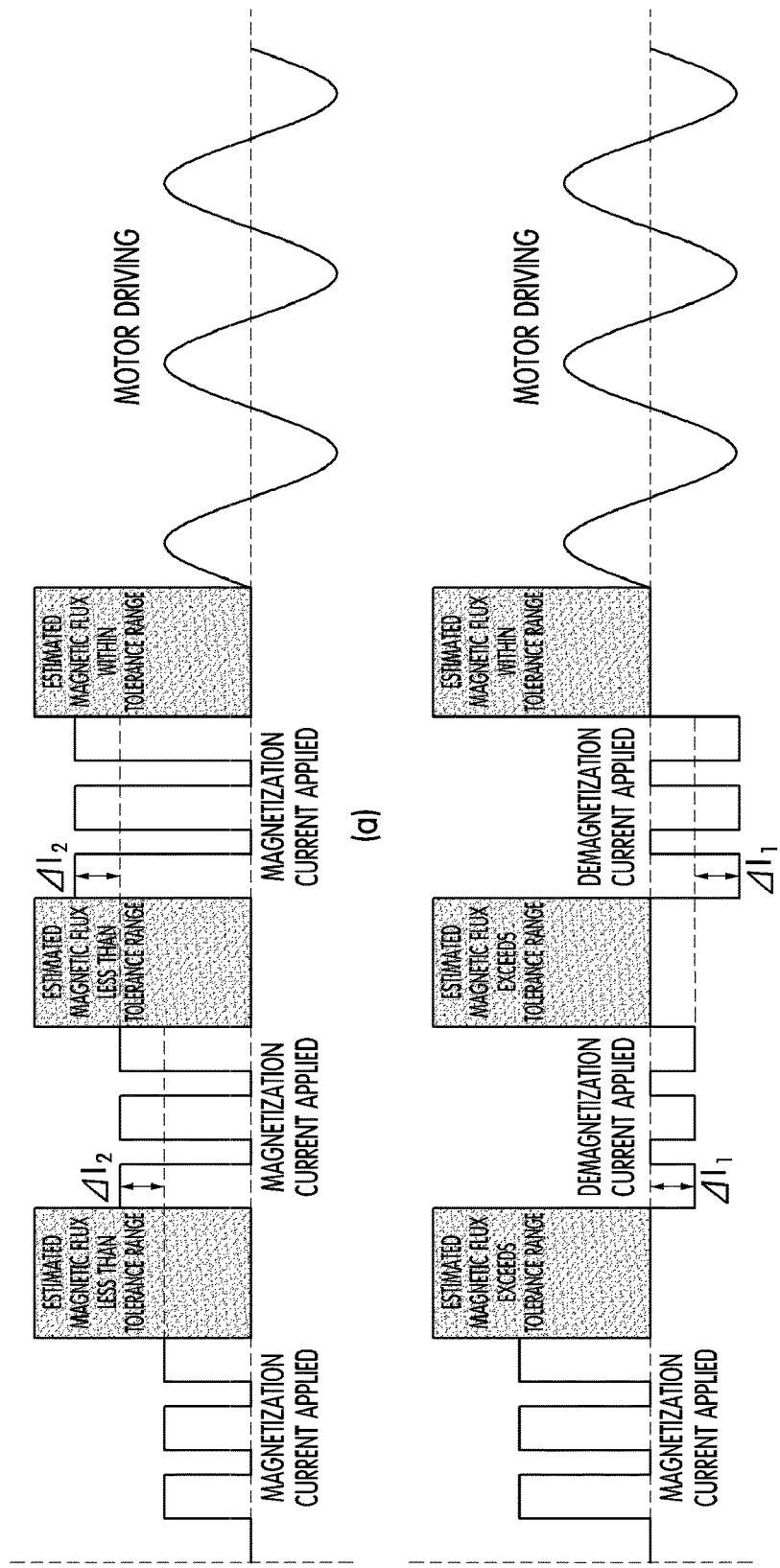
FIG. 3 is a current waveform diagram for describing a low-speed mode operation of an apparatus for controlling a permanent magnet motor according to one embodiment of the present invention.
Figure 4:
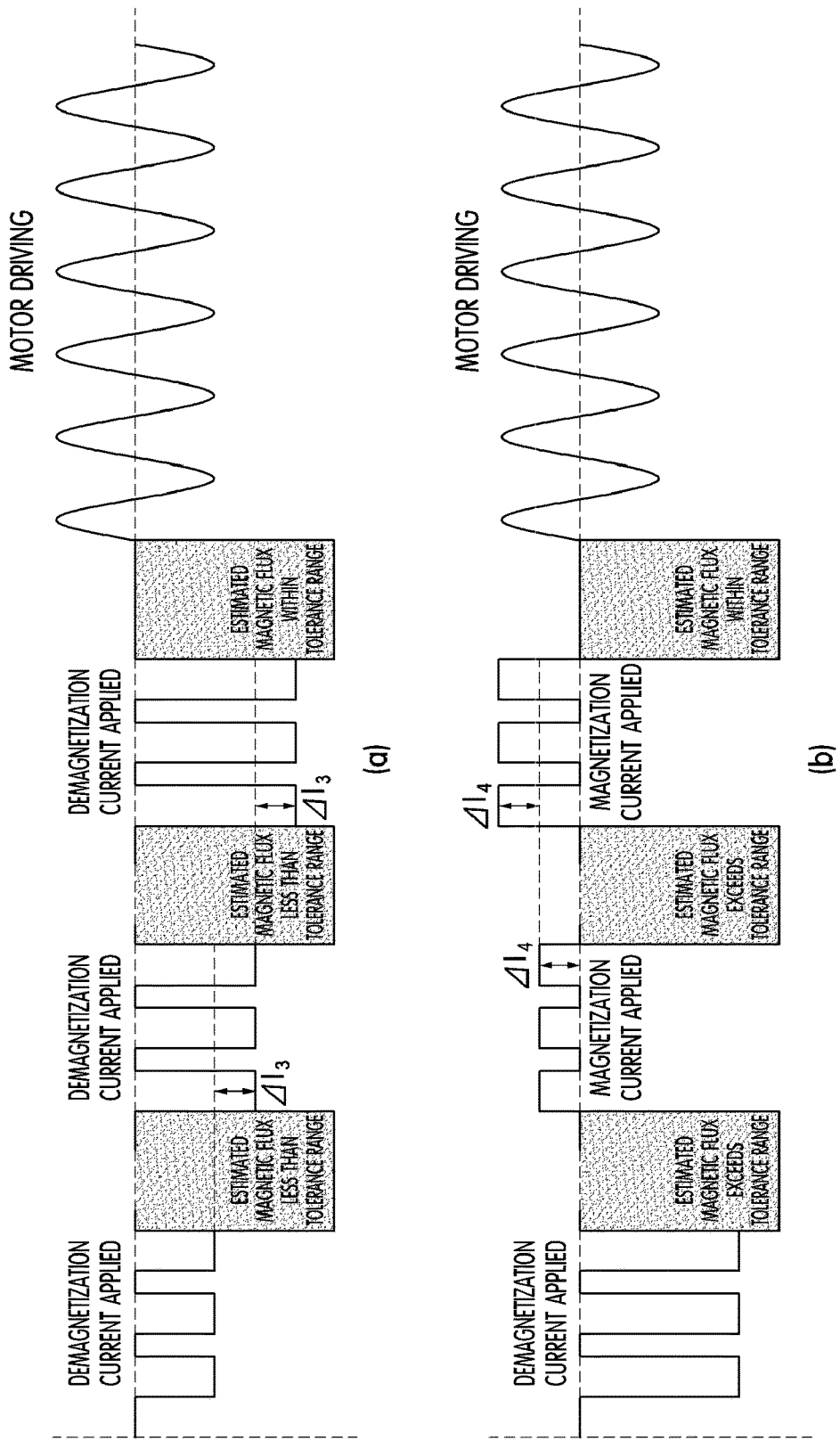
FIG. 4 is a current waveform diagram for describing a high-speed mode operation of an apparatus for controlling a permanent magnet motor according to one embodiment of the present invention.

FIG. 3 is a current waveform diagram for describing a low-speed mode operation of an apparatus for controlling a permanent magnet motor according to one embodiment of the present invention, and FIG. 4 is a current waveform diagram for describing a high-speed mode operation of an apparatus for controlling a permanent magnet motor according to one embodiment of the present invention.

Referring to FIG. 3, in the low-speed mode operation, the magnetization current $I_1$ set in the setting unit 110 is applied in the form of a sine wave of ten cycles or more to preliminarily drive the motor 160, and the magnetic flux estimation unit 130 estimates the magnetic flux to determine whether the magnetic flux is within the tolerance range. When the magnetic flux estimation unit 130 determines that the magnetic flux is out of the tolerance range and is less than optimal magnetic flux for magnetization as illustrated in FIG. 3(A), a certain level of additional magnetization current $\Delta I_2$ is applied to increase the magnetic flux, and estimating the magnetic flux and determining the optimal magnetic flux as described above are repeatedly performed until the magnetic flux falls within the tolerance range. In addition, when the magnetic flux estimation unit 130 determines that the magnetic flux is out of the tolerance range and exceeds the optimal magnetic flux for magnetization as illustrated in FIG. 3(B), a certain level of additional demagnetization current $\Delta I_1$ is applied to decrease the magnetic flux, and estimating the magnetic flux and determining the optimal magnetic flux described as above are repeatedly performed until the magnetic flux falls within the tolerance range. As described above, when the control for additional magnetization or demagnetization is performed according to the estimated magnetic flux and the magnetic flux falls within the tolerance range, the motor 160 starts to drive normally according to the control current corresponding to the estimated magnetic flux.

Similarly, referring to FIG. 4, in the high-speed mode operation, a demagnetization current $I_3$ set in the setting unit 110 is applied in the form of a sine wave of ten cycles or more to preliminarily drive the motor 160, and the magnetic flux estimation unit 130 estimates the magnetic flux to determine whether the magnetic flux is within the tolerance range. When the magnetic flux estimation unit 130 determines that the magnetic flux is out of the tolerance range and is less than the optimal magnetic flux for demagnetization as illustrated in FIG. 4(A), a certain level of additional demagnetization current $\Delta I_3$ is applied to decrease the magnetic flux, and estimating the magnetic flux and determining the optimal magnetic flux as described above are repeatedly performed until the magnetic flux falls within the tolerance range. In addition, when the magnetic flux estimation unit 130 determines that the magnetic flux is out of the tolerance range and exceeds the optimal magnetic flux for demagnetization as illustrated in FIG. 4(B), a certain level of additional magnetization current $\Delta I_4$ is applied to increase the magnetic flux, and estimating the magnetic flux and determining the optimal magnetic flux as described above are repeatedly performed until the magnetic flux falls within the tolerance range. As described above, when the control for additional magnetization or demagnetization is performed according to the estimated magnetic flux and the magnetic flux falls within the tolerance range, the motor 160 starts to drive normally according to the control current corresponding to the estimated magnetic flux.

With the configurations described above, the apparatus for controlling the permanent magnet motor according to one embodiment of the present invention can effectively control the magnetic flux by a motor model based on the current actually measured from the motor, can thus enhance efficiency of the permanent magnet motor, and can adaptively calculate an optimal magnetic flux even when an environment is changed such as with aging of the motor or the like because estimated magnetic flux is controlled, and accordingly efficiency of the motor can be maintained at an optimal state regardless of the environment.

Hereinafter, a method for controlling a permanent magnet motor according to one embodiment of the present invention will be described with reference to FIGS. 5 to 7.

Figure 5:
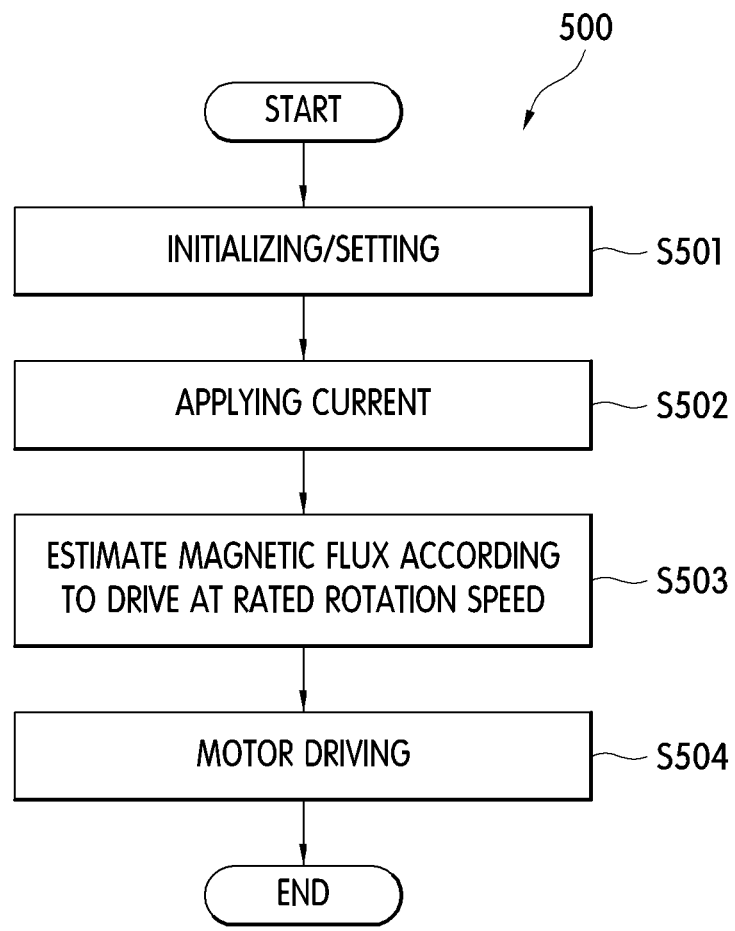
FIG. 5 is a flow chart of a method for controlling a permanent magnet motor according to one embodiment of the present invention.

FIG. 5 is a flow chart of a method for controlling a permanent magnet motor according to one embodiment of the present invention.

A method for controlling a permanent magnet motor 500 is configured with an operation of setting an initial current or initialization for driving a motor (S501), an operation of applying the set current to a motor 160 (S502), an operation of estimating optimal magnetic flux by preliminarily driving the motor 160 at a rated rotation speed according to the applied current (S503), and an operation of driving the motor 160 with a current corresponding to the estimated magnetic flux (S504).

More specifically, as illustrated in FIG. 5, the initial current for magnetization current or demagnetization current for varying the magnetic flux of the motor 160 may be set or initialized (S501). For example, this determines an operation mode of the motor by a selection of a user using the initial value or set value stored in an apparatus for controlling a permanent magnet motor 100, and, for example, demagnetization current $I_1$ may be set to zero and magnetization current $I_2$ may be set to a first set value $I_{20}$ for a low-speed high-torque operation for which magnetization is required for the motor 160 and demagnetization current $I_3$ may be set to a second set value $I_{30}$ and demagnetization current $I_4$ may be set to zero for a high-speed low-torque operation for which demagnetization is required.

Next, the set or initialized current may be applied to the motor 160 to preliminarily drive the motor 160 at a rated rotation speed (S502), and a current and a voltage of the motor 160 may be measured to estimate the magnetic flux of the motor 160 on the basis of the current measured from the motor 160 and a voltage model of the motor 160 according to the measured voltage (S503). Here, the magnetization current or demagnetization current of the motor 160 may be adaptively and repeatedly controlled until the estimated magnetic flux falls within a tolerance range.

Next, the motor 160 may be driven according to the magnetization current or demagnetization current corresponding to the estimated magnetic flux.

Hereinafter, a low-speed operation mode of a method for controlling a permanent magnet motor according to one embodiment of the present invention will be described in detail with reference to another drawing.

Figure 6:
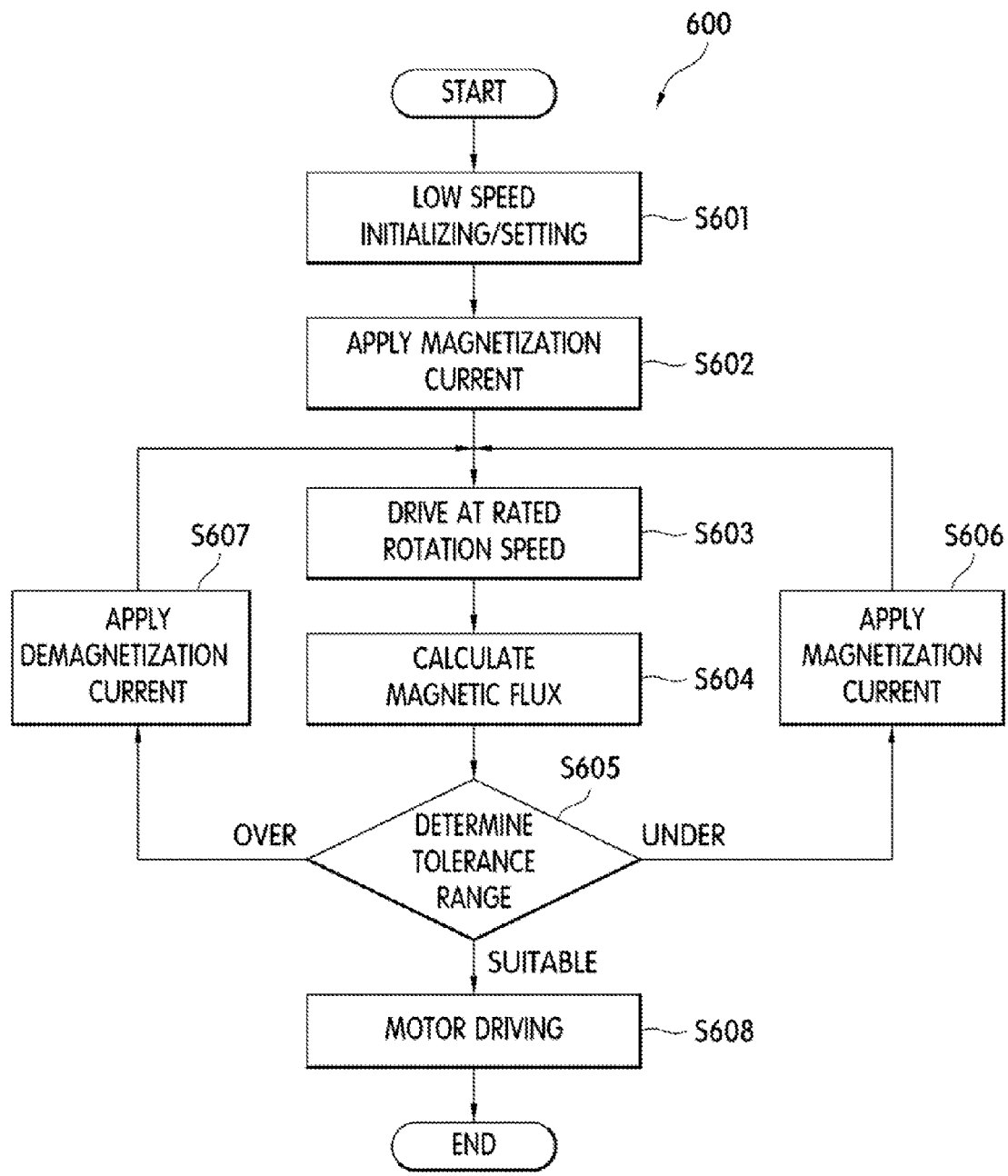
FIG. 6 is a flow chart illustrating a low-speed operation of a method for controlling a permanent magnet motor according to one embodiment of the present invention.

FIG. 6 is a flow chart illustrating a low-speed operation of a method for controlling a permanent magnet motor according to one embodiment of the present invention.

As illustrated in FIG. 6, a low-speed operation 600 of the method for controlling a permanent magnet motor according to one embodiment of the present invention may first include initializing and setting for a magnetic flux mode operation (S601). For example, the magnetization current $I_2$ may be set to the first set value $I_{20}$ and the demagnetization current $I_1$ may be set to zero.

Next, when the set magnetization current is applied to the motor 160 (S602), the motor 160 may be preliminarily driven at a rated rotation speed by the magnetization current $I_2$ of the first set value (S603). Here, a U-phase current is controlled by "+" and a V-phase and W-phase are controlled by "−" for magnetization after aligning the N-pole of the rotor of the motor 160 on a U-phase, and current control in a sine wave form of ten cycles or more is performed for sufficient magnetization.

Next, a voltage and current of the preliminarily driven motor 160 are measured, a q-axis current is calculated according to a voltage model of the motor, and the magnetic flux may be calculated on the basis of the calculated q-axis current and the measured current (S604).

Here, the q-axis current may be calculated according to a mathematical model as in the following equation, $$I_q^M(k+1) = I_q(k) + \frac{T_{SW}}{L_q}\{V_q^*(k) - R_s I_q(k) - \omega_e \cdot L_d I_d(k) - \omega_e \cdot \hat{\lambda}_m(k)\}.$$

Here, $I_q$ may be a measured q-axis current, $T_{SW}$ may be a switching interval, $L_q$ may be q-axis inductance, $V_q^*$ may be a q-axis voltage, $R_s$ may be phase resistance, $\omega_e$ may be an electrical angular velocity, $\lambda_m$ may be estimated magnetic flux, $L_d$ may be d-axis inductance, and $I_d$ may be a d-axis current.

Next, the estimated magnetic flux may be calculated according to a mathematical model as in the following equation, $$\hat{\lambda}_m(k+1) = \hat{\lambda}_m(k) - k_e \cdot (I_q(k) - I_q^M(k)), \quad O < k_e < \frac{L_q f_{SW}}{\omega_e}$$

Here, $I_q$ may be a measured q-axis current, $I_q^M$ may be the calculated q-axis current, $k_e$ may be an estimated gain of magnetic flux, and $f_{SW}$ may be a switching frequency ($1/T_{SW}$).

Next, it is determined whether the magnetic flux calculated as above is within the tolerance range (S605), a certain level of an additional magnetization current $\Delta I_2$ is applied to the motor 160 to increase the magnetic flux for magnetization (S606) when the magnetic flux is determined to be less than the tolerance range, that is, when the magnetic flux for magnetization of the motor 160 is determined to be insufficient, the process returns to operation S603 to drive the motor 160 at a rated rotation speed according to the additional magnetization current $\Delta I_2$ as illustrated in FIG. 3(A), and operation 604 of calculating the magnetic flux and operation 605 of determining the tolerance range are performed.

When the calculated magnetic flux is determined to exceed the tolerance range through the determination of operation S605, that is, when the magnetic flux for magnetization of the motor 160 is determined to be excessively high, a certain level of an additional demagnetization current $\Delta I_1$ is applied to the motor 160 to decrease the magnetic flux for magnetization (S607), the process returns to operation S603 to drive the motor 160 at a rated rotation speed according to the additional demagnetization current $\Delta I_1$ as illustrated in FIG. 3(B), and operation S604 of calculating the magnetic flux and operation S605 of determining the tolerance range are performed.

As described above, by repeating operations S603 to S607, the magnetic flux may be adaptively calculated on the basis of the calculated q-axis current and the measured current so that a difference between the currents is minimized, that is, until the magnetic flux falls within the tolerance range.

When the calculated magnetic flux is determined to be within the tolerance range through the determination of operation S605, a current corresponding to the estimated magnetic flux is applied to the motor 160 to drive the motor 160 in the low-speed mode (S608).

Hereinafter, a high-speed operation mode of a method for controlling a permanent magnet motor according to one embodiment of the present invention will be described in detail with reference to another drawing.

Figure 7:
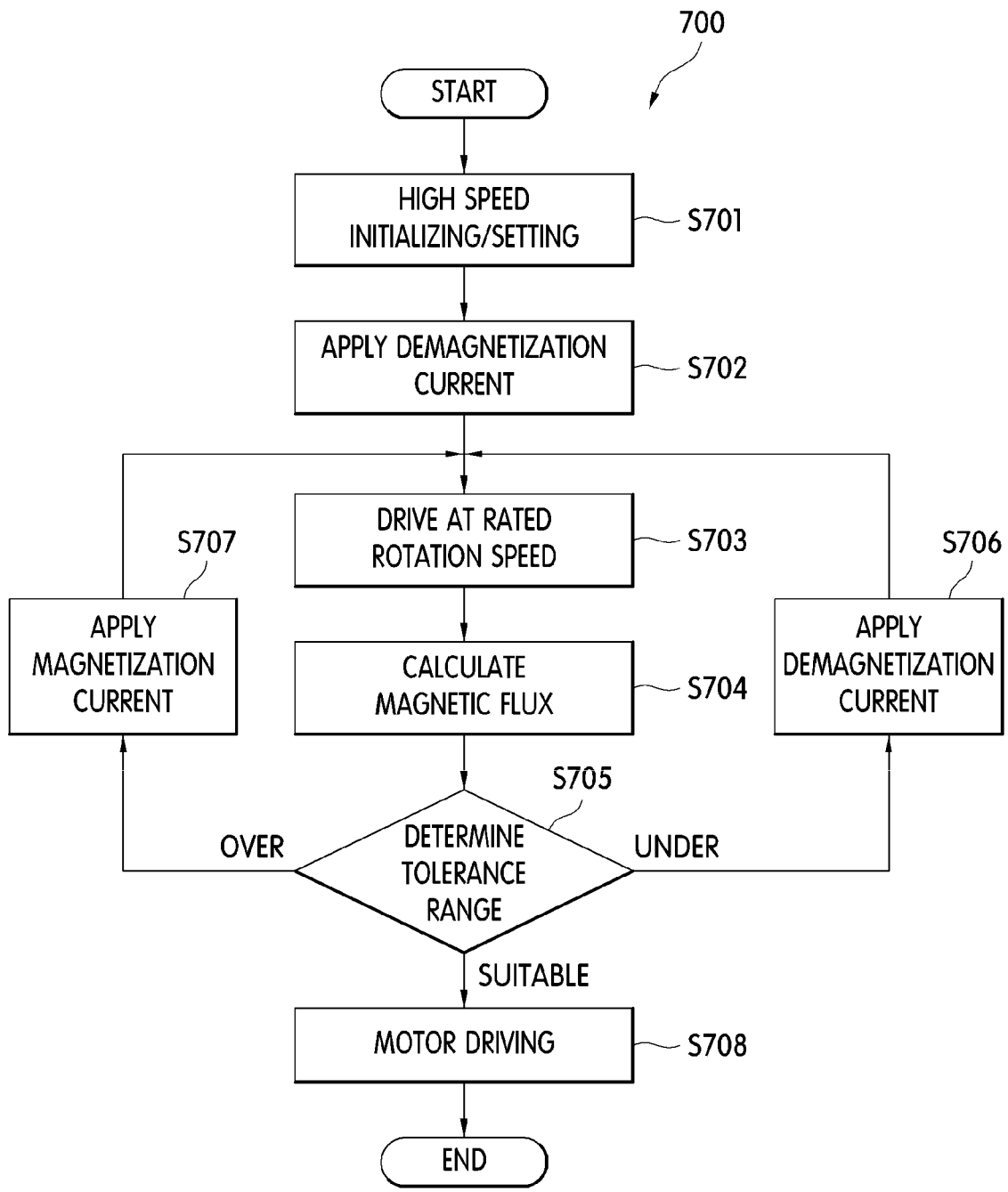
FIG. 7 is a flow chart illustrating a high-speed operation of a method for controlling a permanent magnet motor according to one embodiment of the present invention.

FIG. 7 is a flow chart illustrating a high-speed operation of a method for controlling a permanent magnet motor according to one embodiment of the present invention.

As illustrated in FIG. 7, a high-speed operation 700 of a method for controlling a permanent magnet motor according to one embodiment of the present invention may first include initializing and setting for a magnetic flux mode operation (S701). For example, the demagnetization current $I_3$ may be set to the second set value $I_{30}$ and the magnetization current $I_4$ may be set to zero.

Next, when the set demagnetization current is applied to the motor 160 (S702), the motor 160 may be preliminarily driven at a rated rotation speed by the demagnetization current $I_3$ of the second set value (S703). Here, the U-phase current is controlled by "−" and the V-phase and W-phase are controlled by "+" for demagnetization after aligning the N-pole of the rotor of the motor 160 on the U-phase, and current control in a sine wave form of ten cycles or more is performed for sufficient demagnetization.

Next, the voltage and current of the preliminarily driven motor 160 are measured, a q-axis current is calculated according to a voltage model of the motor, and the magnetic flux may be calculated on the basis of the calculated q-axis current and the measured current (S704).

Here, the q-axis current may be calculated according to a mathematical model as in the following equation, $$I_q^M(k+1) = I_q(k) + \frac{T_{SW}}{L_q}\{V_q^*(k) - R_s I_q(k) - \omega_e \cdot L_d I_d(k) - \omega_e \cdot \hat{\lambda}_m(k)\}.$$

Here, $I_q$ may be a measured q-axis current, $T_{SW}$ may be a switching interval, $L_q$ may be q-axis inductance, $V_q^*$ may be a q-axis voltage, $R_s$ may be phase resistance, $\omega_e$ may be an electrical angular velocity, $\lambda_m$ may be estimated magnetic flux, $L_d$ may be d-axis inductance, and $I_d$ may be a d-axis current.

Next, the estimated magnetic flux may be calculated according to a mathematical model as in the following equation, $$\hat{\lambda}_m(k+1) = \hat{\lambda}_m(k) - k_e \cdot (I_q(k) - I_q^M(k)), \quad O < k_e < \frac{L_q f_{SW}}{\omega_e}$$

Here, $I_q$ may be a measured q-axis current, $I_q^M$ may be the calculated q-axis current, $k_e$ may be an estimated gain of magnetic flux, and $f_{SW}$ may be a switching frequency ($1/T_{SW}$).

Next, it is determined whether the magnetic flux calculated as above is within the tolerance range (S705), a certain level of an additional demagnetization current $\Delta I_3$ is applied to the motor 160 to increase the magnetic flux for demagnetization (S706) when the magnetic flux is determined to be less than the tolerance range, that is, when the magnetic flux for demagnetization of the motor 160 is determined to be insufficient, the process returns to operation S703 to drive the motor 160 at a rated rotation speed according to the additional demagnetization current $\Delta I_3$ as illustrated in FIG.

4(A), and operation S704 of calculating the magnetic flux and operation S705 of the determining the tolerance range are performed.

When the calculated magnetic flux is determined to exceed the tolerance range through the determination of operation S705, that is, when the magnetic flux for demagnetization of the motor 160 is determined to be excessively high, a certain level of the additional magnetization current $\Delta I_4$ is applied to the motor 160 to decrease the magnetic flux for demagnetization (S707), the process returns to operation S703 to drive the motor 160 at a rated rotation speed according to the additional magnetization current $\Delta I_4$ as illustrated in FIG. 4(B), and operation S704 of calculating the magnetic flux and operation S705 of determining the tolerance range are performed.

As described above, by repeating operations S703 to S707, the magnetic flux may be adaptively estimated on the basis of the calculated q-axis current and the measured current so that a difference between the currents is minimized, that is, until the magnetic flux falls within the tolerance range.

When the calculated magnetic flux is determined to be within the tolerance range through the determination of operation S705, a current corresponding to the estimated magnetic flux is applied to the motor 160 to drive the motor 160 in the high-speed mode (S708).

With the methods described above, the apparatus for controlling the permanent magnet motor 100 according to one embodiment of the present invention can effectively control the magnetic flux by a motor model based on the current actually measured from the motor, can thus enhance efficiency of the permanent magnet motor, and can adaptively calculate an optimal magnetic flux even when an environment is changed such as with aging of the motor or the like because estimated magnetic flux is controlled, and accordingly efficiency of the motor can be maintained at an optimal state regardless of the environment.

Embodiments of the present invention have been described above, however, the inventive concept of the present invention is not limited to the embodiments set forth herein, and it should be noted that those skilled in the art who understand the inventive concept may easily propose other embodiments by adding, modifying, and eliminating components within the scope of the inventive concept of the present invention, which are also construed as falling within the scope of the inventive concept of the present invention.

The invention claimed is:

1. An apparatus for adjusting an initial set magnetization current and an initial set demagnetization current in a variable magnetic flux motor comprising;
    a current controller which generates a control current to drive the motor according to a current corresponding to the initial set magnetization current, the initial set demagnetization current, or estimated magnetic flux;
    a motor driver which drives the motor according to the control current of the current controller;
    a measuring instrument which measures a driving voltage and a driving current of the motor; and
    a magnetic flux estimator which preliminarily drives the motor using the current corresponding to the initial set magnetization current, the initial set demagnetization current, or the estimated magnetic flux, estimates magnetic flux of the motor on the basis of the current measured in the preliminary driving and a voltage model of the motor according to the voltage measured in the preliminary driving, and adaptively controls a magnetization current or demagnetization current of the motor so that the estimated magnetic flux falls within a tolerance range;
    wherein the preliminary driving is driving by a current with a sine wave form of ten cycles or more,
    wherein the magnetic flux estimator controls the current controller to generate three times of the magnetization current or demagnetization current or more when calculated magnetic flux is out the tolerance range,
    wherein the magnetic flux estimator controls the current controller to increase magnetization flux current when the estimated magnetic flux is less than optimal magnetic flux, and to increase demagnetization flux current when the estimated magnetic flux is more than optimal magnetic flux in a low-speed mode of the motor,
    wherein the magnetic flux estimator controls the current controller to increase the demagnetization flux current when the estimated magnetic flux is less than optimal magnetic flux, and to increase the magnetization flux current when the estimated magnetic flux is more than optimal magnetic flux in a high-speed mode of motor, and
    wherein the magnetic flux estimator controls the current controller to drive the motor with a current corresponding to the magnetic flux when the calculated magnetic flux is within the tolerance range.

2. The apparatus of claim 1, wherein the magnetic flux estimator includes:
    a motor model current calculator which calculates a q-axis current according to the voltage model of the motor based on the preliminary driving; and
    a magnetic flux calculator which adaptively calculates the magnetic flux on the basis of the calculated q-axis current and the measured current so that a difference between the currents is minimized.

3. The apparatus of claim 2, wherein the motor model current calculator calculates the q-axis current according to the following equation, $$I_q^M(k+1) = I_q(k) + \frac{T_{SW}}{L_q}\{V_q^*(k) - R_s I_q(k) - \omega_e \cdot L_d I_d(k) - \omega_e \cdot \hat{\lambda}_m(k)\}$$

where $I_q$ is a measured q-axis current, $T_{SW}$ is a switching interval, $L_q$ is q-axis inductance, $V_q^*$ is a q-axis voltage, $R_s$ is phase resistance, $\omega_e$ is an electrical angular velocity, $\hat{\lambda}_m$ is estimated magnetic flux, $L_d$ is d-axis inductance, $I_d$ is a d-axis current, $I_q^M$ is the calculated q-axis current, k indicates that a variable it modifies has the value of the variable at the kth sampling in discrete equation, and k+1 indicates that the variable it modifies has the value of the variable at the (k+1)th sampling in discrete equation.

4. The apparatus of claim 2, wherein the magnetic flux calculator calculates the estimated magnetic flux according to the following equation, $$\hat{\lambda}_m(k+1) = \hat{\lambda}_m(k) - k_e \cdot (I_q(k) - I_q^M(k)), \quad 0 < k_e < \frac{L_q f_{SW}}{\omega_e}$$

where $I_q$ is a measured q-axis current, $I_q^M$ is the calculated q-axis current, $k_e$ is an estimated gain of magnetic flux, $f_{SW}$ is a switching frequency ($1/T_{SW}$), $L_q$ is q-axis inductance, $\omega_e$ is an electrical angular velocity, $\hat{\lambda}_m$ is estimated magnetic flux, $T_{SW}$ is a switching interval, k indicates that a variable it modifies has the value of the variable at the kth sampling in discrete equation, and k+1 indicates that the variable it modifies has the value of the variable at the (k+1)th sampling in discrete equation.

5. A method for adjusting an initial set magnetization current and an initial set demagnetization current in a variable magnetic flux motor comprising:

an operation of preliminary driving the motor using a current with a sine wave form of ten cycles or more corresponding to the initial set magnetization current or the initial set;

an operation of estimating magnetic flux in which a current and a voltage of the motor are measured at the operation of preliminary driving, magnetic flux of the motor is estimated on the basis of the measured current and a voltage model of the motor according to the measured voltage, and a magnetization current or demagnetization current of the motor is adaptively controlled so that the estimated magnetic flux falls within a tolerance range; and an operation of driving the motor according to a current corresponding to the estimated magnetic flux, wherein the operation of estimating magnetic flux includes:

an operation of control to generate three times of the magnetization current or demagnetization current or more when calculated magnetic flux is out of the tolerance range, an operation of control to increase magnetization flux current when the estimated magnetic flux is less than optimal magnetic flux, and to increase demagnetization flux current when the estimated magnetic flux is more than optimal magnetic flux in a low-speed mode of the motor, an operation of control to increase the demagnetization flux current when the estimated magnetic flux is less than optimal magnetic flux, and to increase the magnetization flux current when the estimated magnetic flux is more than optimal magnetic flux in a high-speed mode of the motor, and an operation of control to drive the motor with a current corresponding to the magnetic flux when the calculated magnetic flux is within the tolerance range.

6. The method of claim 5, wherein the operation of estimating magnetic flux includes:

an operation of preliminarily driving the motor at a rated rotation speed according to the set magnetization current or demagnetization current;

an operation of adaptively calculating the magnetic flux, in which a q-axis current is calculated according to the voltage model of the motor based on the preliminary driving, on the basis of the calculated q-axis current and the measured current so that a difference between the currents is minimized;

an operation of determining whether the calculated magnetic flux falls within the tolerance range; and an operation of applying additional magnetization current or additional demagnetization current that falls outside the tolerance range to adjust the magnetic flux according to a result of the operation of determining.

7. The method of claim 6, wherein the operation of calculating the magnetic flux includes calculating the q-axis current according to the following equation, $$I_q^M(k+1) = I_q(k) + \frac{T_{SW}}{L_q}\{V_q^*(k) - R_s I_q(k) - \omega_e \cdot L_d I_d(k) - \omega_e \cdot \hat{\lambda}_m(k)\}$$

where $I_q$ is a measured q-axis current, $T_{SW}$ is a switching interval, $L_q$ is q-axis inductance, $V_q^*$ is a q-axis voltage, $R_s$ is phase resistance, $\omega_e$ is an electrical angular velocity, $\hat{\lambda}_m$ is an estimated magnetic flux, $L_d$ is d-axis inductance, $I_d$ is a d-axis current, $I_q^M$ is the calculated q-axis current, k indicates that a variable it modifies has the value of the variable at the kth sampling in discrete equation, and k+1 indicates that the variable it modifies has the value of the variable at the (k+1)th sampling in discrete equation.

8. The method of claim 6, wherein the operation of calculating the magnetic flux includes calculating the estimated magnetic flux according to the following equation, $$\hat{\lambda}_m(k+1) = \hat{\lambda}_m(k) - k_e \cdot (I_q(k) - I_q^M(k)), \quad O < k_e < \frac{L_q f_{SW}}{\omega_e}$$

where $I_q$ is a measured q-axis current, $I_q^M$ is the calculated q-axis current, $k_e$ is an estimated gain of magnetic flux, $f_{SW}$ is a switching frequency ($1/T_{SW}$), $L_q$ is q-axis inductance, $\omega_e$ is an electrical angular velocity, $\hat{\lambda}_m$ is estimated magnetic flux, $T_{SW}$ is a switching interval, k indicates that a variable it modifies has the value of the variable at the kth sampling in discrete equation, and k+1 indicates that the variable it modifies has the value of the variable at theH (k+1)th sampling in discrete equation.

* * * * *

UNITED STATES PATENT AND TRADEMARK OFFICE
CERTIFICATE OF CORRECTION

| | | |
|---|---|---|
| PATENT NO. | : 10,135,373 B2 | Page 1 of 1 |
| APPLICATION NO. | : 15/320354 | |
| DATED | : November 20, 2018 | |
| INVENTOR(S) | : Myung Bok Kim, Sung Ho Lee and Bong Woo Kwak | |

It is certified that error appears in the above-identified patent and that said Letters Patent is hereby corrected as shown below:

In the Claims

<u>Claim 8, Column 14, Line 45</u>:
Delete "theH" and replace with -- the --.

Signed and Sealed this
Twenty-sixth Day of February, 2019

Andrei Iancu
*Director of the United States Patent and Trademark Office*